United States Patent [19]

Vanaschen et al.

[11] Patent Number: 4,902,331
[45] Date of Patent: Feb. 20, 1990

[54] PROCESS FOR BENDING A GLASS SHEET AND SUPPORT DEVICE ADAPTED TO THIS PROCESS

[75] Inventors: Luc Vanaschen, Eupen, Belgium; Hans-Werner Kuster, Aachen, Fed. Rep. of Germany; Herbert Radermacher, B-Raeren, Belgium

[73] Assignee: Saint-Gobain Vitrage, Courbevoie, France

[21] Appl. No.: 214,958

[22] Filed: Jul. 5, 1988

[30] Foreign Application Priority Data

Jul. 2, 1987 [DE] Fed. Rep. of Germany ....... 3721863

[51] Int. Cl.⁴ .......................................... C03B 23/025
[52] U.S. Cl. ........................................ 65/106; 65/104; 65/273; 294/64.1
[58] Field of Search ................. 65/104, 106, 107, 273, 65/290, 291; 294/64.1, 64.2, 64.3

[56] References Cited

U.S. PATENT DOCUMENTS

| | | | |
|---|---|---|---|
| 3,117,815 | 1/1964 | Creskoff | 294/64.1 |
| 4,682,997 | 7/1987 | Halberschmidt et al. | 65/104 X |
| 4,764,196 | 8/1988 | Boutier et al. | 65/104 X |
| 4,775,402 | 10/1988 | Letemps et al. | 65/104 X |

FOREIGN PATENT DOCUMENTS 766145  10/1971  Belgium ............................. 65/106

Primary Examiner—Arthur Kellogg
Attorney, Agent, or Firm—Oblon, Spivak, McClelland, Maier & Neustadt

[57] ABSTRACT

A process and apparatus for shaping a glass sheet according to which the sheet is lifted above the conveying plane by a device for supporting a glass sheet consisting of a box open at the bottom whose opening at the bottom corresponds to the shape of the glass sheet to be grasped and which is slightly smaller than the glass sheet so that, on the edges of the glass sheet, a narrow annular contact surface is formed and so that the partial vacuum prevailing in the box is limited to such a value that the weight of the glass sheet is essentially compensated for, then is applied against a bending form by a current of hot gas directed upward. The process is used in the production of shaped glazings.

3 Claims, 2 Drawing Sheets

PROCESS FOR BENDING A GLASS SHEET AND SUPPORT DEVICE ADAPTED TO THIS PROCESS

BACKGROUND OF THE INVENTION

1. Field of the Invention

The invention relates to a process for bending glass sheets and a device for supporting a glass sheet heated to the forming temperature in a horizontal position, said device consisting of an enclosure in which a partial vacuum can be established and of a contact surface provided with suction orifices directed downward and against which the glass sheet is held by a suction effect.

2. Discussion of the Background

Various processes for producing bent glass sheets are known, in particular automobile glazings, which use a support device consisting of an enclosure in which a partial vacuum is established and of a contact surface provided with suction orifices directed downward. The support device is used to lift the glass sheets, heated to the bending temperature in a tunnel furnace, above the horizontal conveyor belt and deposit them on a bending tool or on another conveying device. Various embodiments of these support devices, for example, have been proposed in the patent publication Nos. DE-2 000 271, EP-3391, EP-3392 and EP-182 638. In all known embodiments, the contact surface—against which the glass sheet is held by a suction effect—is a plate, of flat surface or slightly bent, provided with vertical bores or ducts leaving the contact surface and ending in an enclosure under a partial vacuum that can be regulated. As a general rule, the partial vacuum is obtained by means of a fan placed directly on this support device. The support device is mobile along the vertical plane and optionally in a horizontal plane.

The plate provided with suction orifices that the support devices according to the art comprise is generally of a specific ceramic. The ceramic plates are rather expensive, because all the ducts must be provided.

When these support devices are used, the entire top face of the glass sheet comes in contact with the lower face of the suction plate. The feel of the top face of the glass sheet is always unfavorable if the glass sheets are sensitive to direct contact. When the top face is provided with a sensitive overlayer, for example, with a layer of printed enamel which is then in the molten state considering the temperature of the glass, these support devices cannot be used because the layer of molten enamel sticks to the contact surface and is then destroyed or at least damaged by the mechanical contact.

It is also known how to shape a glass sheet conducted by a roller conveyor under an upper bending form and lifted by an ascending current of hot air which flattens the glass sheet against the upper bending form. The glass sheet is then retrieved by a tempering frame which transfers it between blowing boxes. This process is described in a detailed manner in French Patent No. 2 567 508. The upper bending form, in this case, does not need to be pierced and is therefore less expensive. Moreover, the current of hot air acts on the entire lower face of the glass, therefore, in a way there is a pneumatic pressing which assures a very good shaping quality. However, in this process the energy expenditures are rather great because the hot air current is established for a long period of time.

SUMMARY OF THE INVENTION

The invention has as its object a shaping process derived from the one described in French Patent No. 2 567 508, but with a lower operating cost and making it possible to process glass sheets that are partially covered on their upper face with a layer sensitive to direct contact.

The bending process according to the invention is of the type where the glass sheets are conveyed in the bending station by rollers, lifted by a difference in pressure acting on the bottom face of the glass sheets and are pressed against a bending form placed above the roller conveyor by means of a hot gas current directed from below toward the glass sheets, as described in French Patent No. 2 567 508. The process according to the invention is characterized in comparison with this known process by the fact that the pressure difference that is used to lift glass sheets above the conveying rollers is obtained by means of a box under partial vacuum which surrounds the bending form and which comprises an opening on the bottom corresponding to the shape of the glass sheet, the opening delimiting an annular contact surface touching the edges of the glass sheet and by the fact that raising of the box brings about raising of the glass sheet up to the bending form, the hot gas current being established at the moment when the glass sheet touches the bending form.

In contrast with the process known by French Patent No. 2 567 508, removal of the glass sheet above the conveying rollers and its lifting up to the bending form are not due to the dynamic pressure of the hot gas current directed upward but to the static differential pressure alone which acts on the bottom face of the glass sheet because of the partial vacuum in the box. Only after the glass sheet has touched the bending form thanks to the box under partial vacuum is the hot gas current established; this hot gas current is therefore used exclusively for bending the glass sheet. In this manner, the period for which the hot gas current is established is shorter which makes it possible to reduce the energy expenditures without losing the advantage that bending by an ascending hot gas current obtains.

Support of the glass sheet is obtained by a device made of a box open through the bottom whose opening at the bottom corresponds to the shape of the glass sheet to be grasped and is slightly smaller than it so that on the edges of the glass sheet a narrow annular contact surface is formed and so that the partial vacuum prevailing in the box is limited to such a value that the weight of the glass sheet is essentially compensated for. According to a first embodiment, the box is made so that the lateral walls determine a section whose shape corresponds to that of the glass and so that the bottom face of these lateral walls form the annular contact surface.

According to another embodiment, the box comprises a flat bottom wall in which a suction opening is made. This wall can consist of an interchangeable plate; adaptation of the suction device to another glass sheet form can then be obtained by the exchange of this plate alone.

In an advantageous development of the invention, the partial vacuum prevailing in the box can be regulated to obtain a pressure difference that varies as a function of the weight of the glass sheet, and will always be higher than it so that the pressure difference causes a limited crosswise bending upward. In this was, unwanted bending of the glass sheet due to the effects of gravity can, for example, be compensated for by an imposed counterbending.

The support device according to the invention can be used with other known bending processes, particularly those where the glass sheet is applied against an upper bending form by suction effect. In this case also, it is possible to dissociate the phases of removal of the glass and of bending against the upper form.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
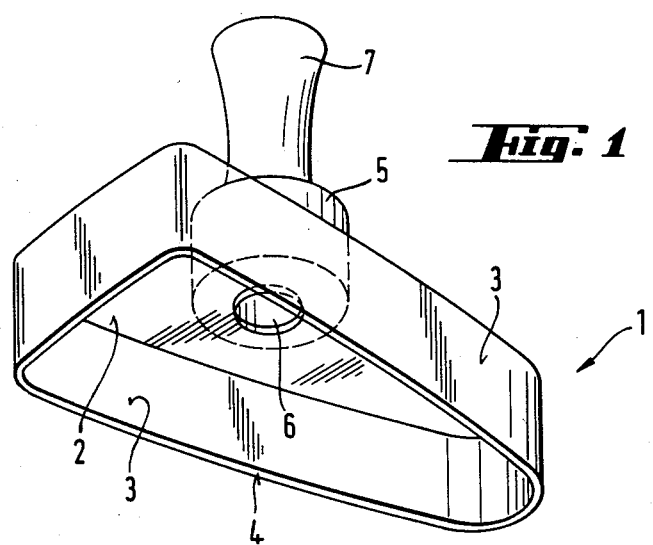
FIG. 1 is a first example of embodiment of the support device according to the invention.

Support device 1 represented in FIG. 1 consists of a box, for example made of a sheet of heat-resistant steel. A wall 2 appears on the top and a closed vertical wall 3 appears on the sides. The box is open at the bottom. Bottom face 4 of wall 3 is located in a plane. Wall 3 has a shape that corresponds to the size and periphery of the sheet to be lifted, so that the outside shape of bottom face 4 and the outside shape of the lifted sheet are in congruence. If the thickness of wall 3 reaches, for example, 3 mm when the glass sheet is lifted, only a small portion of its surface, in this case a 3 mm strip on the edges of the sheet, is in contact with the support device.

As is customary for suction devices of this art, a fan 5 is fastened directly to the support device. Fan 5 sucks air into the cavity of the box through opening 6 and pipe 7. Fan 5 can be adjusted finely and accurately and the suction effect is dependent on the weight of the glass sheet to be lifted, which means that the regulating is performed as a function of the size and thickness of the sheet so that the pressure difference obtained holds the sheet securely against bottom face 4 without producing bothersome crosswise bending. Depending on the situation, a regulating cycle is provided for regulating fan 5 as a function of the partial vacuum prevailing in the box closed by the glass sheet.

Figure 2:
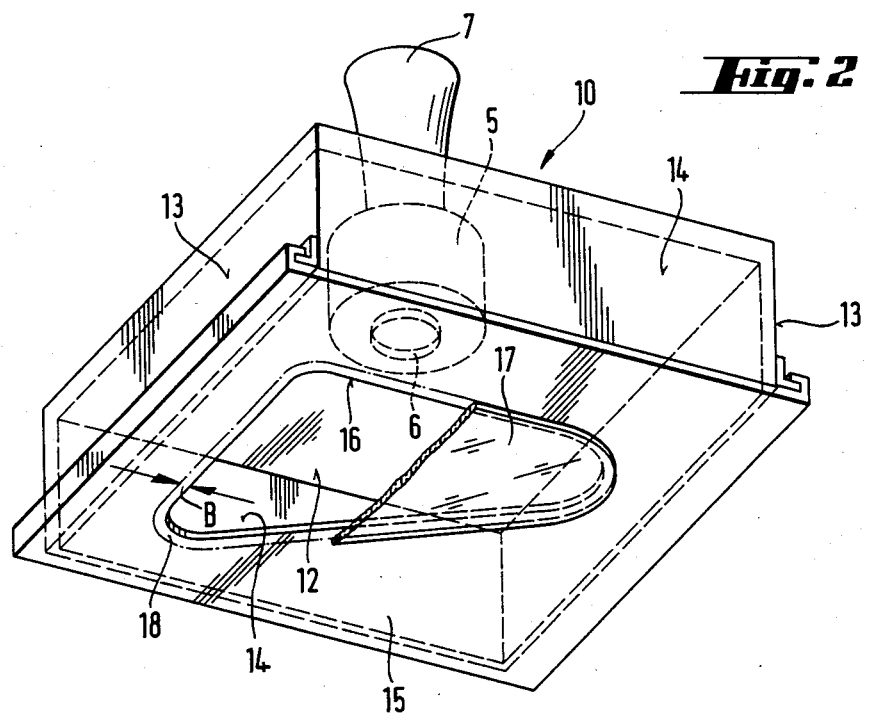
FIG. 2 is a second example of embodiment of the support device according to the invention.

Support device 1 is upwardly mobile, however, to simplify the diagram the corresponding equipment is not shown in FIGS. 1 and 2. It is the same for the other equipment necessary for the good operation of the device and that is well-known to a man of the art. Included in these is a device for accurate positioning of the glass sheet moving on the conveyor belt and the devices for controlling the raising-lowering movements of device 1 and those connected to fan 5.

Support device 1 shown in FIG. 1 is suited only for glass sheets of a given shape; at each change of shape it is also necessary to change the support device. On the other hand, support device 10 shown in FIG. 2 can be adapted in a simple manner to various shapes of sheets. The box consists in this case of a rectangular top plate 12 and of lateral walls 13, 14 also rectangular which delimit a cavity whose section in a horizontal plane is larger than the surface of the sheet to be grasped. Underneath, the box is closed by an interchangeable flat plate 15. In this plate 15 is an opening 16 whose shape corresponds to the shape of sheet 17. In this manner, the contact between plate 15 and glass sheet 17 occurs only along a narrow strip 18 whose width B has an order of magnitude of 2 to 5 mm.

The fastening of interchangeable bottom 15 to the box is obtained according to suitable means by taking care to assure appropriate airtightness between plate 15 and walls 13, 14. To adapt the support device to glass sheets of another size, it is enough to replace plate 15 with another plate whose opening 15 corresponds to the new size of the glass sheets.

The support device described with reference to FIGS. 1 and 2 is more particularly useful in all cases where a glass sheet heated to the bending temperature must be lifted from a conveying device, then deposited on another support particularly on an annular or solid bending form on which the glass sheet is bent under the effect of its weight. In these cases, it is substituted for known suction plates.

Figure 3:
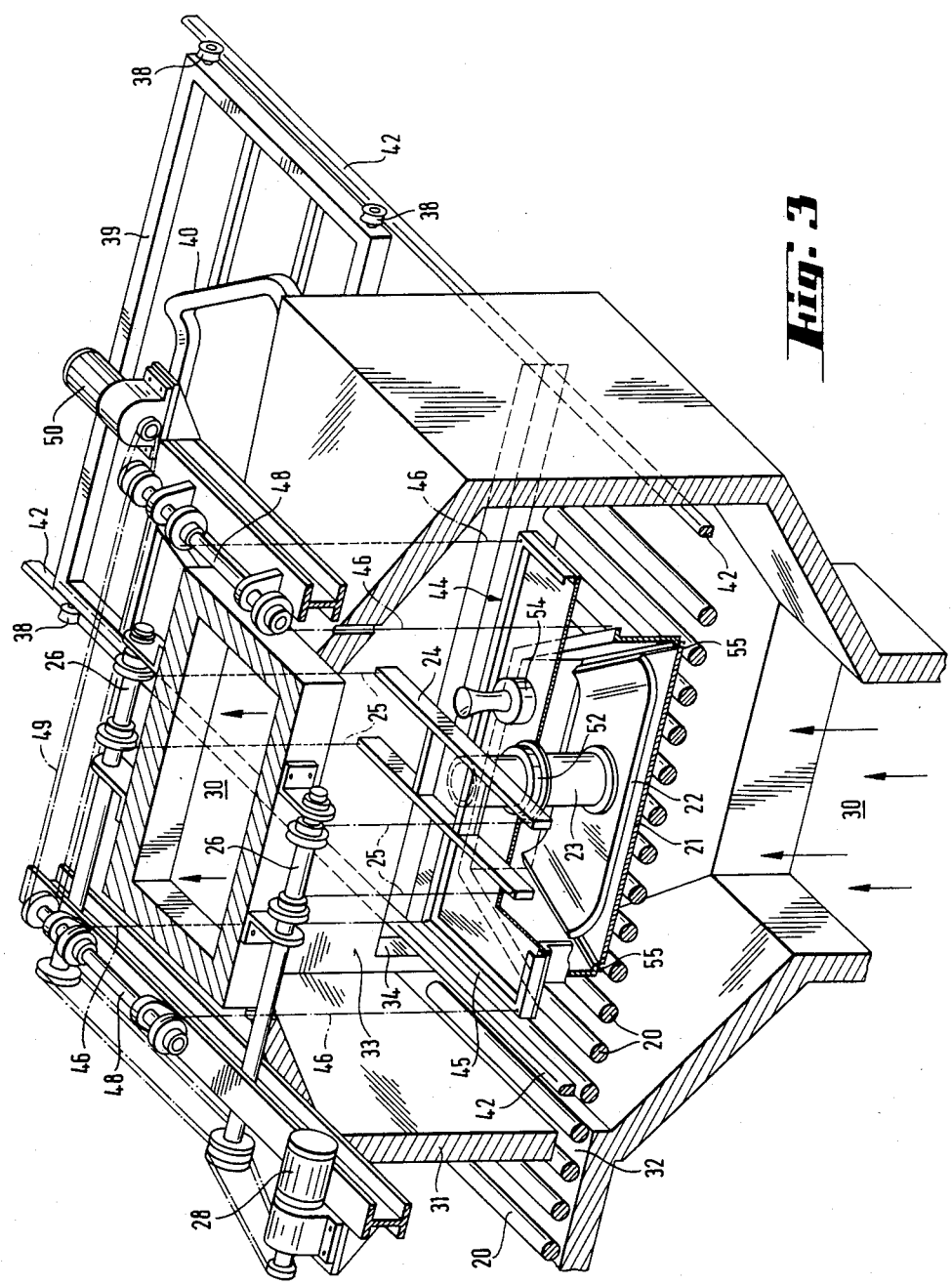
FIG. 3 shows the use of a support device according to the invention in a bending device in which the glass sheet is pressed against a bending form placed above the conveying plane by a hot gas current directed from below toward the glass sheet.

The support device according to the invention can also, because of its particular design, be used for other bending processes according to which the shaping of the glass sheet 17 results from pneumatic pressing against a bending form placed above the glass sheet. Its use with such a bending process is described below with reference to FIG. 3 which represents a bending station in detail.

The bending station comprises a horizontal conveyor made of conveying rollers 20 by means of which glass sheet 21 is conveyed through a furnace, not shown, then from this furnace to the bending station to be placed under a solid bending form 22. Bending form 22 is fastened to a pipe 23 itself attached to a frame 24. Frame 24 is suspended by chains or cables 25 which are operated by pulleys 26 placed on the outside of the housing surrounding the bending station. Pulleys 26 are controlled by motors 28 thanks to which bending form 22 can be raised or lowered.

Bending form 22 is placed in a vertical conduit 30 in which a current of air heated to about 600° C. circulates upward with a given pressure and volume. Lateral wall 31 of conduit 30 exhibits at the top of the bending chamber itself, an opening 32 making possible the penetration of glass sheets 21. Wall 33 exhibits an opening 34 that is used for the removal of the bent glass sheet.

The bending of glass sheets is obtained due to the hot gas current directed upward which presses glass sheets 21 against the face of bending form 22 directed downward.

To convey the bent glass sheets outside of the bending station, a carriage 39 mounted on wheels 38 is provided on which a support ring 40 is placed whose shape and size correspond to the periphery of the glass sheet. Carriage 39 rolls on two rails 42 which extend to the inside of the bending station.

Bending form 22 is surrounded by a box 44 which can be moved upward or downward independently of bending form 22. For this purpose, box 44 is provided on its upper face with a frame 45 which is attached to four chains or cables 46. Chains or cables 46 pass through the upper wall of the housing surrounding the bending station and are operated from the exterior of the bending chamber by pulleys 48. Transmitted by belt 49, the rotation of pulleys 48 is controlled by motor 50 which, in this manner, lifts or lowers box 44.

Against pipe 23 that carries bending form 22, the upper wall of box 44 is blocked by a seal 52 allowing relative movements between box 44 and bending form 22. Box 44 is provided with a fan 54 and exhibits on its lower face an opening which corresponds to the shape of glass sheet 21 and is slightly smaller than it so that the glass sheet is grasped and held along its outside edge by the surface of edge 55 limiting the opening of box 44.

The operating cycle of this bending device is as follows:

The glass sheet heated to the bending temperature penetrates into the bending station through opening 32 and is exactly positioned by a mechanism not shown. During this time, box 44 is just above the conveying plane, so that the annular surface of edge 55 is above the upper surface of glass sheet 21. Bending form 22 that is on the inside of the box also assumes such a position that the lowest part of the bending surface is located a few centimeters above glass sheet 21.

As soon as glass sheet 21 is correctly positioned, box 44 is lowered just above sheet 21 while fan 54 is actuated. When the surface of edge 55 of box 44 comes in contact with sheet 21, the latter is sucked and held by the partial vacuum in box 44. Box 44 and bending form 22 are then raised simultaneously, raising the glass sheet with them, the relative positions of these various elements remaining unchanged. Carriage 39 and support ring 40 can then be placed under bending form 22. When bending form 22 has reached its highest position, box 4 still continues to rise somewhat. At this moment, the hot gas current is established. While box 44 continues its rise relative to bending form 22, glass sheet 21 is pressed against the bending surface of form 22 and is detached from the surface of edge 55 of box 44. The weight of sheet 21 is then totally offset by the hot gas current which, in addition, exerts a uniform pressure and bends glass sheet 21 in the shape corresponding to bending form 22. To assist the bending process and particularly the bending on the edges of the glass sheet, fan 54 can be kept operating. Optionally, the suction effect of fan 54 can even be boosted at this time.

During or just after this bending process, carriage 39 carrying ring 40 is brought under bending form 22 which is then lowered just above ring 40. The hot gas current is eliminated or simple reduced and glass sheet 21 falls under the effect of its weight onto ring 40. It is then conducted to the next processing station and the device is ready for a new bending cycle.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A process for bending a glass sheet in a horizontal position heated to a bending temperature, which comprises:
   conveying a glass sheet to a bending station by a conveyor;
   lifting the glass sheet by a pressure difference acting on the bottom face of the glass sheet;
   pressing the glass sheet against a bending form placed above the conveyor by directing a hot gas current from below toward the glass sheet wherein the pressure difference used to lift the glass sheets above the conveyor is obtained by means of a box, under a regulated partial vacuum, having walls surrounding the bending form with an opening on the bottom of said box corresponding to the shape of the glass sheet, the opening delimiting an annular contact surface; and
   contacting a bottom face of said walls of said box with edges of the glass sheet wherein lifting up of the glass sheet to the bending form for bending by the raising of the box and the hot gas current is established at the moment the glass sheet touches the bending form.

2. Process according to claim 1, which comprises maintaining the suction effect in the box during bending by the hot gas current for strengthening the pressure force imparting the bending, particularly on the edges of the glass sheet.

3. A device for bending a glass sheet comprising:
   a conveyor which includes a plurality of horizontal rollers;
   a bending form located above the conveyor surrounding a bending station and a pipe through which a vertical hot gas current is passed, directed upwardly against the bending form, and;
   a box positioned so as to surround the bending form and in which a partial vacuum is established, said box being provided with a lower opening for suction, said opening corresponding to the shape of the glass sheet and being slightly smaller than said glass sheet and wherein the box is mounted so as to be vertically mobile relative to the bending form.

* * * * *